(12) United States Patent
Jeon

(10) Patent No.: US 8,825,326 B2
(45) Date of Patent: Sep. 2, 2014

(54) METHOD OF CONTROLLING ELECTRIC PARKING BRAKE

(75) Inventor: Jaewoo Jeon, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 745 days.

(21) Appl. No.: 13/092,833

(22) Filed: Apr. 22, 2011

(65) Prior Publication Data

US 2011/0295478 A1 Dec. 1, 2011

(30) Foreign Application Priority Data

Jun. 1, 2010 (KR) .................. 10-2010-0051649

(51) Int. Cl.
- *G06F 7/70* (2006.01)
- *B60T 7/10* (2006.01)
- *B60T 13/74* (2006.01)
- *B60T 7/22* (2006.01)
- *B60T 8/1755* (2006.01)
- *B60W 10/184* (2012.01)
- *B60W 10/18* (2012.01)

(52) U.S. Cl.
CPC .. *B60T 7/107* (2013.01); *B60T 7/22* (2013.01); *B60T 8/1755* (2013.01); *B60W 10/184* (2013.01); *B60W 10/18* (2013.01); *B60T 13/746* (2013.01)
USPC .............................. 701/70; 303/20; 242/421.1

(58) Field of Classification Search
CPC ......... B60T 8/1755; B60T 8/172; B60T 7/22; B60W 10/184; B60W 10/18
USPC ...................... 701/22, 70, 75; 303/20, 186, 3; 188/265; 242/421.1, 421.4; 180/65.1
See application file for complete search history.

(56) References Cited

U.S. PATENT DOCUMENTS

| 4,199,118 | A * | 4/1980 | Tetro et al. ................. 242/421.1 |
| 4,286,757 | A * | 9/1981 | Wirth ......................... 242/421.1 |
| 8,322,798 | B2 * | 12/2012 | Kondo et al. .................... 303/20 |
| 2008/0071456 | A1 | 3/2008 | Shiraki |
| 2008/0086253 | A1* | 4/2008 | Nakayama ...................... 701/80 |
| 2009/0099748 | A1 | 4/2009 | Watanabe et al. |
| 2010/0072811 | A1* | 3/2010 | Kondo et al. .................... 303/20 |
| 2010/0286857 | A1* | 11/2010 | Otake ............................. 701/22 |

FOREIGN PATENT DOCUMENTS

| JP | 2003-083373 A | 3/2003 |
| JP | 2008-068836 A | 3/2008 |
| JP | 2009-090854 A | 4/2009 |
| KR | 10-2007-0038131 A | 4/2007 |

* cited by examiner

*Primary Examiner* — Behrang Badii
(74) *Attorney, Agent, or Firm* — Knobbe Martens Olson & Bear LLP

(57) ABSTRACT

A method of controlling an electric parking brake of a vehicle includes calculating a desired braking force based on the vehicle condition at an instruction of applying a braking force, and starting a braking motor of the electric parking brake. The method further includes determining whether a braking force is increasing by measuring current applied to the braking motor, calculating a braking correction value based on the measured current when determined that a braking force is not increasing, calculating a load torque based on the braking correction value and the measured current when determined that a braking force is increasing, and stopping the braking motor when the load torque is greater than the desired braking force.

5 Claims, 2 Drawing Sheets

METHOD OF CONTROLLING ELECTRIC PARKING BRAKE

CROSS-REFERENCE TO RELATED APPLICATIONS

The present application claims priority to Korean Patent Application Number 10-2010-0051649 filed on Jun. 1, 2010, the entire contents of which application is incorporated herein for all purposes by this reference.

BACKGROUND

1. Field

The present disclosure relates to a method of controlling an electric parking brake.

2. Description of Related Art

In general, electric parking brakes (hereafter, referred to as "EPB) of vehicles are systems that electronically achieve the functions of the existing manual parking brakes, and allow a parking brake to automatically operate when the engine stops or allow a parking brake to operate by control of an actuator, by operating an EPB switch.

In the functions of the EPB, a DAR (Drive Away Release) function is a function that automatically releases a parking brake, when the acceleration pedal is pressed down, with the parking brake operating. The EPB is automatically released in departure (acceleration pedal pressed down) with the parking brake automatically locked by the EPB.

Such EPB measures the actuator current and the number or revolution of a parking motor and stores them as reference values, when a braking force operating the parking brake is applied and the parking force is removed to release the parking brake. Further, it is required to measure both of the current and the number of revolution of the braking motor in the way of controlling the current value when applying the braking force and controlling positions according to the number of revolution of the braking motor when releasing the braking force. The EPB systems requires to include a position sensor for measuring the number of revolution of the braking motor and a current sensor for measuring the current in order to control the operation of the braking motor and controls the braking motor on the basis of the reference value, such that it is difficult to always reflect the current condition of a vehicle.

The information disclosed in this Background of the Invention section is only for enhancement of understanding of the general background and should not be taken as an acknowledgement or any form of suggestion that this information forms the prior art already known to a person skilled in the art.

SUMMARY

Various aspects of the present invention are directed to provide a method of controlling an electric parking brake that can improve reliability of control and reduce the manufacturing cost, by controlling the operation of a parking brake on the basis of current values according to changes in state of an actuator, without measuring the number of revolution of a braking motor.

An embodiment of the present invention provides a method of controlling an electric parking brake, which include the steps of: a calculating a desired braking force that calculates a desired braking force by determining a vehicle condition, when an instruction of applying a braking force is applied; a determining the increase of braking force that determines whether a braking force is increasing by measuring current of an actuator controlling operation of a braking motor of a vehicle, when the braking motor is operated in order to output the desired braking force; a calculating a braking correction value that calculates a braking correction force to determine the condition of the actuator, when the braking force is not increasing; a calculating load torque that calculate load torque according to the braking correction value, when the braking force is increasing; and a stopping a motor that stops the braking motor, when the load torque is larger as a result of comparing the load torque with the desired braking force.

The calculating load torque may be performed again, when the load torque is smaller than the desired braking force as a result of comparing the load torque with the desired braking force.

The determining the increase of braking force may determine that the braking force increases, when the actuator current increases.

Another embodiment of the present invention provides a method of controlling an electric parking brake, which include the steps of: a calculating a desired releasing force that calculate a desired releasing force by determining the condition of a vehicle, when an instruction of releasing a braking force is applied; a determining the decrease of braking force that determines whether the braking force is decreasing by measuring current of an actuator controlling operation of a braking motor of the vehicle, when the braking motor is operated in order to output the desired releasing force; a calculating a releasing correction value that calculates a releasing correction value to determine the condition of the actuator, when the braking force is decreasing; a recalculating a re-desired braking releasing force that recalculates the desired releasing force on the basis of the releasing correction value; a calculating load torque that calculates load torque according to the braking correction value after recalculating the re-desired braking releasing force; and a stopping a motor that stops the braking motor, when the re-desired braking releasing force is larger as a result of comparing the load torque with the re-desired braking releasing force.

The calculating load torque may calculate load torque according to the braking correction value which has been calculated when an instruction of applying a braking force has been applied right before the instruction of releasing the braking force, when the braking force is not decreasing.

The calculating a releasing correction value may be performed again, when the load torque is the same or larger, as a result of comparing the load torque with the re-desired braking releasing force.

The calculating load torque may be performed when the determining the decrease of braking force determines that the braking force is not decreasing.

According to the embodiments of the present invention, since the method of controlling an electric parking brake controls the operation of a parking brake on the basis of current values according to changes in state of an actuator without measuring the number of revolution of a braking motor, it is possible to improve reliability of control and reduce the manufacturing cost.

The methods and apparatuses according to embodiments of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF EMBODIMENTS

Reference will now be made in detail to various embodiments of the present invention(s), examples of which are illustrated in the accompanying drawings and described below. While embodiments of the invention(s) will be described in conjunction with embodiments, it will be understood that present description is not intended to limit the invention(s) to those embodiments. On the contrary, the invention(s) is/are intended to cover not only the embodiments, but also various alternatives, modifications, equivalents and other embodiments, which may be included within the spirit and scope of the invention as defined by the appended claims.

Figure 1:
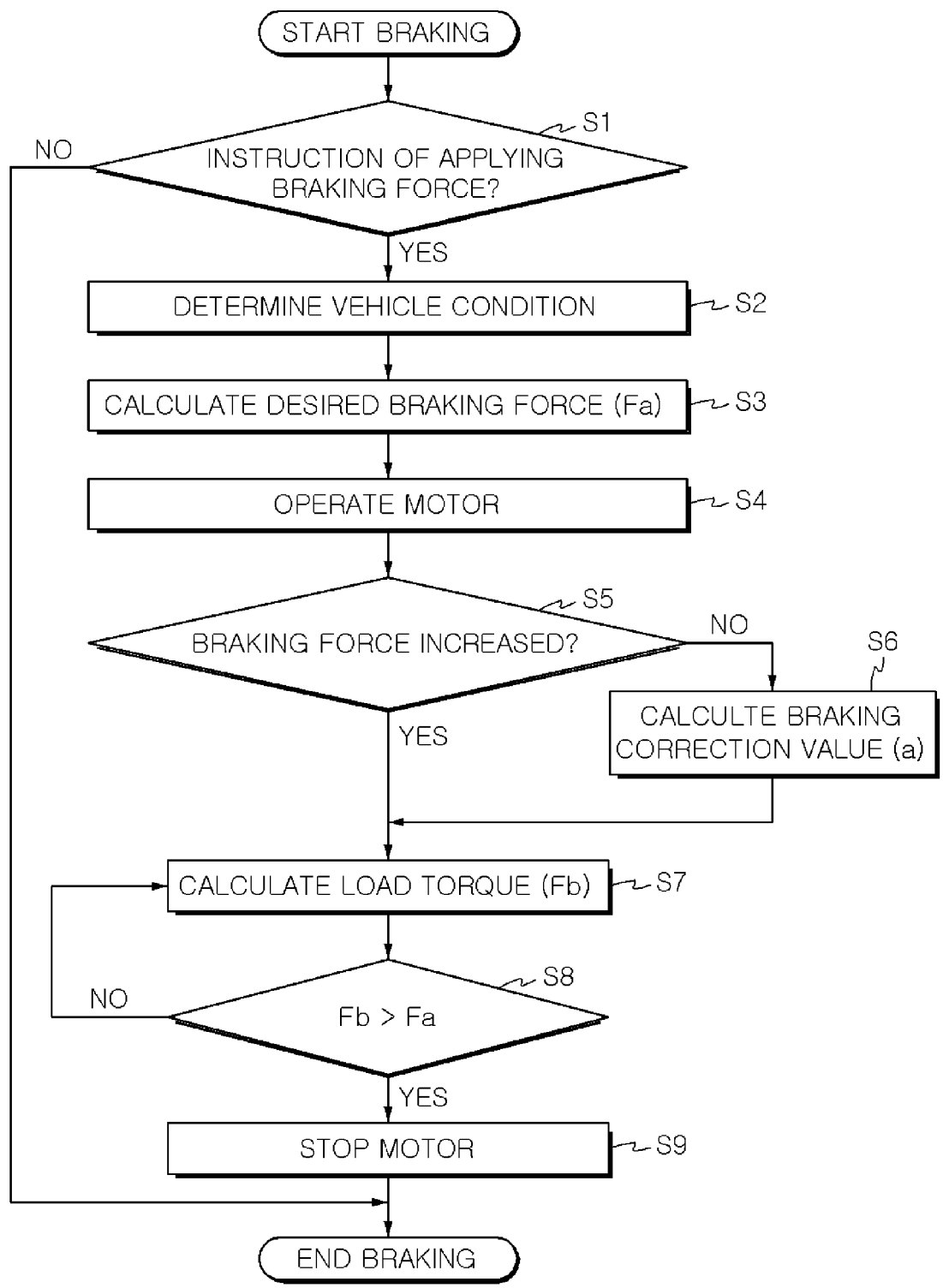
FIG. 1 is a flowchart illustrating a method of controlling an electric parking brake according to an embodiment of the present invention when applying a braking force.

FIG. 1 is a flowchart illustrating a method of controlling an electric parking brake according to an embodiment of the present invention when applying a braking force.

First, a method of controlling an electric parking brake when applying a braking force includes a step of determining an instruction of applying a braking force (S1). This step includes determining whether an instruction of applying a braking force is applied. The instruction of applying a braking force can be created by operating an electric parking brake (hereafter, referred to as "EPB") switch. The EPB switch is electrically connected with an actuator controlling the operation of the EPB and the actuator determined whether an instruction of applying a braking force is applied by the operation of the EPB switch.

The method includes a step of determining a vehicle condition (S2). In this step, a vehicle condition is determined when it is determined that an instruction of applying a braking force is applied. The actuator determines whether the vehicle is now braked and the vehicle can apply a braking force in response to a vehicle condition signal applied by a can communication and a vehicle condition signal applied through the switch, in the determining a vehicle condition (S2). The vehicle condition signal may be signals representing an engine condition, a transmission condition, an electric brake condition, vehicle speed, conditions of the gears and steering wheel, but is not limited thereto in the present invention. Further, the method includes a step of calculating a desired braking force (S3). A desired braking force Fa is calculated when the vehicle is not braked now and can apply a braking force.

The actuator calculates the desired braking force Fa in accordance with the vehicle conditions in the step of calculating the desired braking force Fa (S3). The desired braking force Fa may be calculated by a desired braking force according to the weight of the vehicle which is stored in the actuator, or may be calculated by vehicle conditions that can influence the current parking performance of the vehicle, such as the inclination of the road, a desired parking value, and the tire size, in addition to the weight of the vehicle.

The method includes a step of operating a motor (S4) such that a braking motor operates to increase the braking force, in order that the actuator operates the braking motor to have the desired braking force Fa, when the desired braking force Fa is calculated.

Further, the method includes a step of determining the increase of braking force (S5) that determines whether the brake pads are in press-contact to the disc and the braking force is substantially increased, when the braking motor is operated. The actuator measures the actuator current for controlling the operation of the braking motor, using the sensor in the step of determining the increase of braking force (S5), and it is determined that the braking force is increasing, when the measured current is increasing. Further, the actuator measures the actuator current for controlling the operation of the braking motor in the step of determining the increase of braking force (S5), and it is determined that the braking force is not increasing, when the current is maintained. The actuator current is not increased and maintained until the brake pads contact the disc due to a gap between the brake pads and the disc in the vehicle, even if the braking motor operates.

The method includes a step of calculating a braking correction value (S6) that calculates a braking correction value 'a' for determining the operational condition of the actuator, because the actuator current is constantly maintained, when the braking force does not increase in the step of determining the increase of braking force (S5). The braking force continues increasing until the brake pads contact the disc, that is, while the braking correction value 'a' exceeds the internal resistance, such that it continues being measured and the operation condition of the actuator can be determined.

Further, the method includes a step of calculating load torque (S7) that corrects and calculates load torque Fb from the braking correction value 'a' calculated in the step of calculating a braking correction value (S6), when the braking force continues increasing in the step of determining the increase of braking force (S5). The load torque Fb is calculated as a value that is in proportion to the actuator current increasing in the step of calculating load torque (S7), and corrected by the braking correction value in order to correct changes in current that is changed by temperature and inflow of lubricant.

Further, the method includes a step of comparing braking force (S8) that determines whether the load torque Fb is larger than the desired braking force Fa, by comparing the desired braking force Fa calculated in the step of calculating a desired braking force (S3) with the load torque Fb calculated in the step of calculating load torque (S7). The method includes a step of stopping a motor (S9) that stops the operation of the braking motor, when the load torque Fb is larger than the desired braking force Fa and it is determined that braking is performed at above the desired braking force Fa and the EPB has sufficient braking force.

Further, the method includes repeating the step of calculating load torque (S7) that calculates load torque Fb changed by the actuator current, until braking is performed at above the desired braking force Fa, when the load torque Fb is smaller than the desired braking force Fa.

Since the method of controlling an electric parking brake described above calculates the load torque on the basis of current values according to changes in state of an actuator and controls the operation of a parking brake on the basis of the load torque without measuring the number of revolution of a braking motor, it is possible to improve reliability of control and reduce the manufacturing cost.

Figure 2:
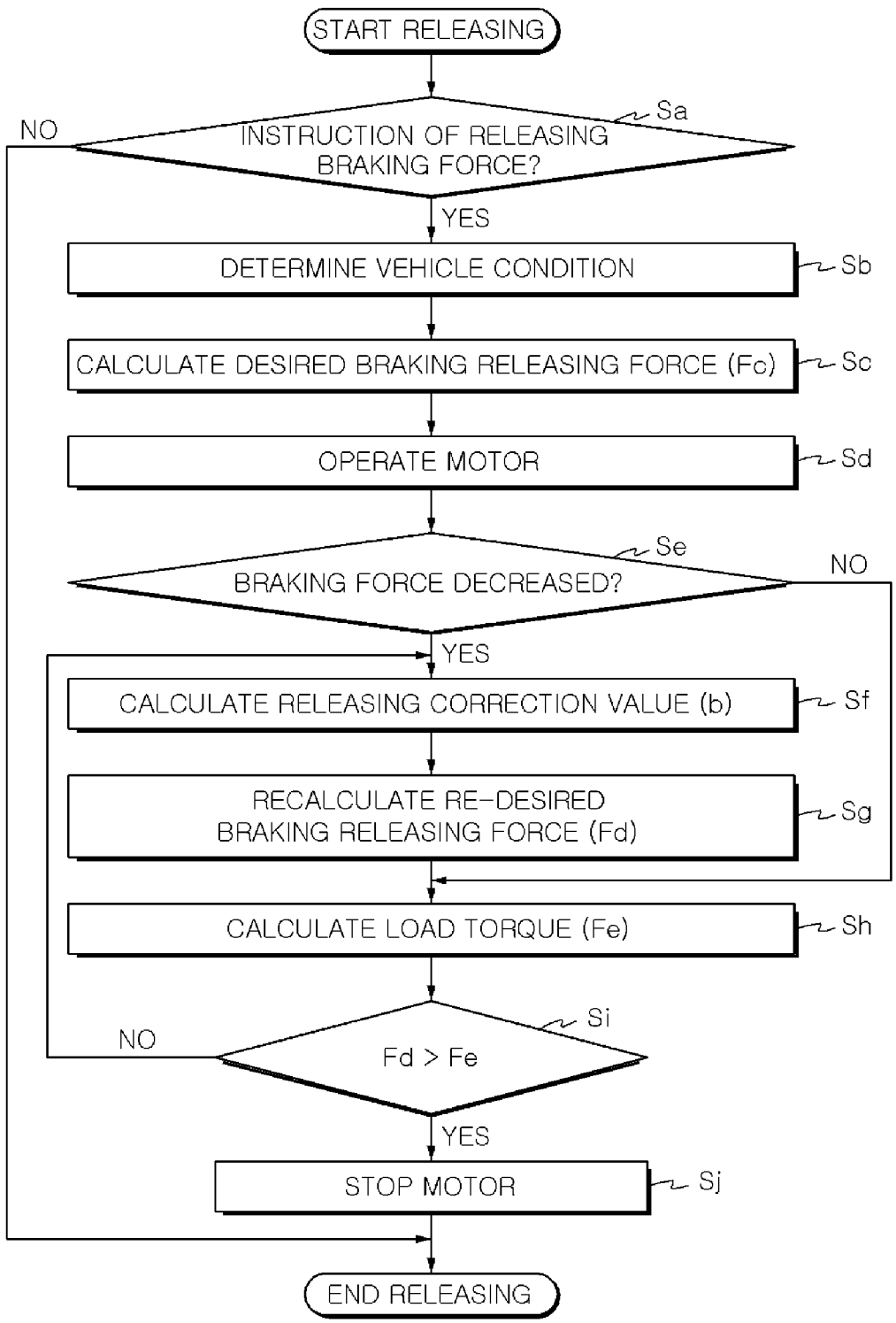
FIG. 2 is a flowchart illustrating a method of controlling an electric parking brake according to another embodiment of the present invention when releasing a braking force.

FIG. 2 is a flowchart illustrating a method of controlling an electric parking brake according to another embodiment of the present invention when releasing a braking force. Removal of the braking force of this electric parking brake and application of the braking force of the electric parking brake shown in FIG. 1 are alternately performed. That is, the removal and application of the braking force of the EPB are alternately performed.

First, the method of controlling an electric parking brake when releasing a braking force includes a step of determining an instruction of releasing a braking force (Sa) that determines whether an instruction of releasing a braking force is applied. The instruction of releasing a braking force may be created by operating an EPB switch, with the vehicle braked and stopped. The EPB switch is electrically connected with an actuator controlling the operation of the EPB and the actuator determined whether an instruction of releasing a braking force is applied by the operation of the EPB switch. Further, the instruction of releasing a braking force determines that the EPB switch is operated and an instruction or releasing is applied, when the driver presses down the acceleration pedal, with the vehicle braked and stopped.

The method includes a step of determining a vehicle condition (Sb) that determines a vehicle condition, when it is determined that an instruction of releasing a braking force is applied. The actuator determines whether the vehicle is now not braked and the vehicle can release a braking force in response to a vehicle condition signal applied by a can communication and a vehicle condition signal applied through the switch, in the step of determining a vehicle condition (Sb). The vehicle condition signal may be signals representing an engine condition, a transmission condition, an electric brake condition, vehicle speed, conditions of the gears and steering wheel, but is not limited thereto in the present invention. Further, the method includes a step of calculating a desired braking releasing force (Sc) for calculating a desired braking releasing force Fc, when the vehicle is braked now and can release a braking force.

The actuator calculates the desired braking releasing force Fc in accordance with the vehicle conditions in the step of calculating the desired braking releasing force (Sc). The desired braking releasing force Fc may be calculated by a desired braking releasing force according to the weigh of the vehicle which is stored in the actuator, or may be calculated by vehicle conditions that can influence the current parking performance of the vehicle, such as the inclination of the road, a desired parking value, and the tire size, in addition to the weight of the vehicle.

The method includes a step of operating a motor (Sd) such that a braking motor operates to decrease the braking force, in order that the actuator operates the braking motor to have the desired braking releasing force Fc, when the desired braking releasing force Fc is calculated.

Further, the method includes a step of determining the decrease of braking force (Se) that determines whether the braking force is substantially decreased until the pressed brake pads are separated from the disc, when the braking motor is operated. The actuator measures the actuator current for controlling the operation of the braking motor, using the sensor in the step of determining the decrease of braking force (Se), and it is determined that the braking force is decreasing, when the measured current is decreasing.

Further, the actuator measures the actuator current for controlling the operation of the braking motor in the step of determining the decrease of braking force (Se), and it is determined that the braking force is not decreasing, when the current is maintained. The actuator current is not decreased and maintained, when the pressed brake pads are separated from the disc, after the braking motor is operated.

The method includes a step of calculating a releasing correction value (Sf) that calculates a releasing correction value 'b' for determining the operational condition of the actuator in the braking force decreasing section, when it is determined that the braking force is decreasing in the step of determining the decrease of braking force (Se). The releasing correction value 'b' continues being calculated while the braking force decreases until the brake pads are separated from the disc, such that the operational condition of the actuator can be determined.

Further, the current operational condition of the actuator is determined on the basis of the releasing correction value 'b' calculated as described above, and a re-desired braking releasing force Fd obtained by recalculating the desired braking releasing force Fc calculated in the step of calculating a desired braking releasing force (S3) is calculated on the basis of the determination. For example, when the current braking force of the vehicle is 'x' and the desired braking releasing force Fc is set to 'x-a' to releasing the braking force, the re-desired braking releasing force Fd is recalculated to be less than 'x-a' on the basis of the releasing correction value 'b' when the braking force decreases less than 'x-a' in the braking force decreasing section. The re-desired braking releasing force Fd becomes a value according to the current operational condition of the actuator.

Further, the method includes a step of calculating load torque (Sh) that corrects and calculates load torque Fe from the braking correction value 'a' calculated when a braking force is applied in order to determine the operational condition of the actuator, after the re-desired braking releasing force Fb is recalculated as described above. The braking correction value 'a' is the braking correction value 'a' calculated to determine the operational condition of the actuator when the previous braking force is applied. Further, the step of calculating load torque (Sh) is performed even if the actuator current is not decreased and maintained, when the brake pads pressed in the step of determining the decrease of braking force (Se) are separated from the disc.

That is, the step of calculating load torque (Sh) calculates a releasing correction value 'b' and is performed after calculating the re-desired braking releasing force Fd, when it is determined that the braking force is decreasing in the step of determining the decrease of braking force (Se). Further, the calculating load torque Sh is immediately performed, when the braking force is not decreased and maintained in the step of determining the decrease of braking force (Se).

Further, the method includes a step of comparing braking releasing force (Si) that determines that the re-desired braking releasing force Fd is larger by comparing the re-desired braking releasing force Fd with the load torque Fe, after the step of calculating load torque (Sh). The method determines that the braking is released at above the load torque Fb and the braking of the EPB is released not to interfere with the traveling of the vehicle, and performs a step of stopping a motor (Sj) that stops the operation of the braking motor, when the re-desired braking releasing force Fd reflecting the current condition of the actuator is larger than the load torque Fb.

Further, the method determines that the braking force is not applied yet and performs a step of calculating a releasing correction value (Sf) changed by the actuator current until the braking force is released, when the re-desired braking releasing force Fd reflecting the current condition of the actuator is larger than the load torque Fb.

Since the method of controlling an electric parking brake described above calculates the re-desired braking releasing force on the basis of current values according to changes in state of an actuator and controls the operation of a parking brake on the basis of the load torque without measuring the number of revolution of a motor, it is possible to improve reliability of control and reduce the manufacturing cost.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to explain certain principles of the invention and their practical application, to thereby enable others skilled in the art to make and utilize various embodiments of the present invention, as well as various alternatives and modifications thereof. It is intended that the scope of the invention be defined by the Claims appended hereto and their equivalents.

What is claimed is:

1. A method of controlling an electric parking brake of a vehicle, the method comprising:
   calculating a desired braking force based on the vehicle condition at an instruction of applying a braking force;
   starting a braking motor of the electric parking brake;
   determining whether a braking force is increasing by measuring current applied to the braking motor;
   calculating a braking correction value based on the measured current when determined that a braking force is not increasing;
   calculating a load torque based on the braking correction value and the measured current when determined that a braking force is increasing; and
   stopping the braking motor when the load torque is greater than the desired braking force.

2. The method as defined in claim 1, further comprising repeating the step of calculating the load torque when the braking motor is operating and the load torque is smaller than the desired braking force.

3. The method as defined in claim 1, wherein it is determined that that the braking force increases when the current increases.

4. The method of claim 1, wherein the rotational speed of the braking motor is not measured while the braking motor is operating.

5. An electric parking brake system configured to perform the method of controlling an electric parking brake according to claim 1.

* * * * *